Nov. 4, 1952  H. F. RUSSELL  2,616,391
BREADING PAN
Filed Jan. 4, 1951

Herman F. Russell
INVENTOR.

BY *Clarence A. O'Brien
and Harvey B. Jacobson*
Attorneys

UNITED STATES PATENT OFFICE 2,616,391

BREADING PAN

Herman F. Russell, Port Huron, Mich.

Application January 4, 1951, Serial No. 204,292

2 Claims. (Cl. 118—19)

This invention relates to improvements in food preparation utensils and cooking ware.

An object of this invention is to provide a mechanically simple kitchen utensil used for breading or flouring or otherwise coating meats, fish or other articles of foodstuff, said utensil having a pair of juxtaposed and spaced screens constituting a pocket to accommodate the food articles and a bread crumb, flour, cracker meal, etc. chamber adjacent to the compartment whereby upon shaking of the casing containing all of these elements, the articles retained in the food compartment are thoroughly coated preparatory to frying or otherwise cooking.

Ancillary objects and features of importance will become apparent in following the description of the illustrated form of the invention.

Figure 1:
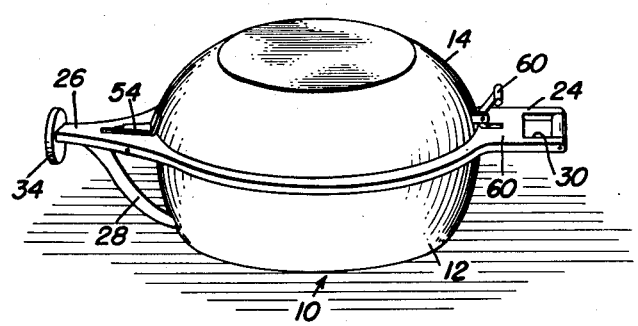
Figure 1 is a perspective view of the device.
Figure 2:
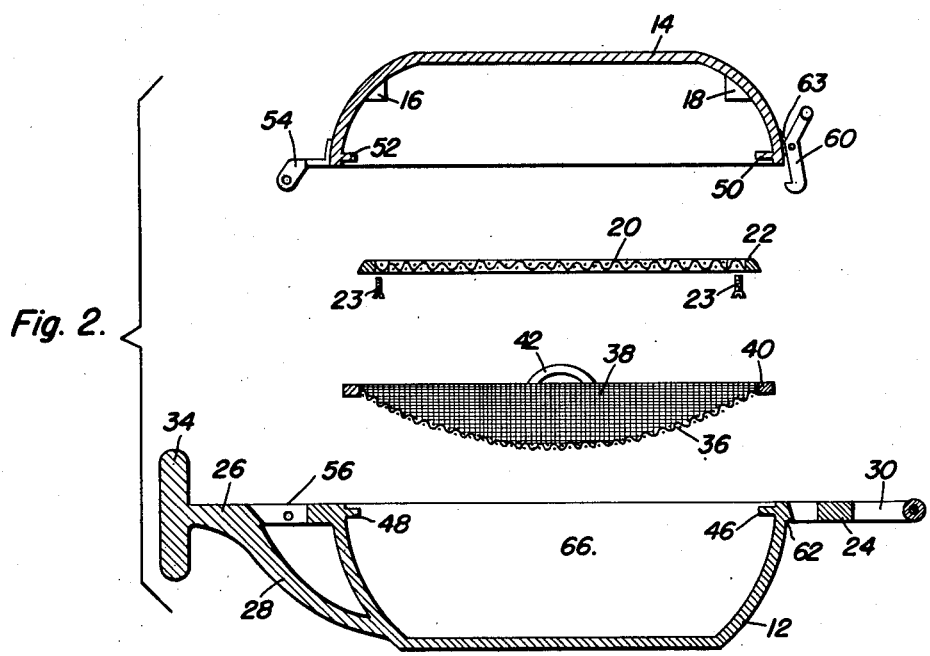
Figure 2 is an exploded sectional view of the device in Figure 1.
Figure 3:
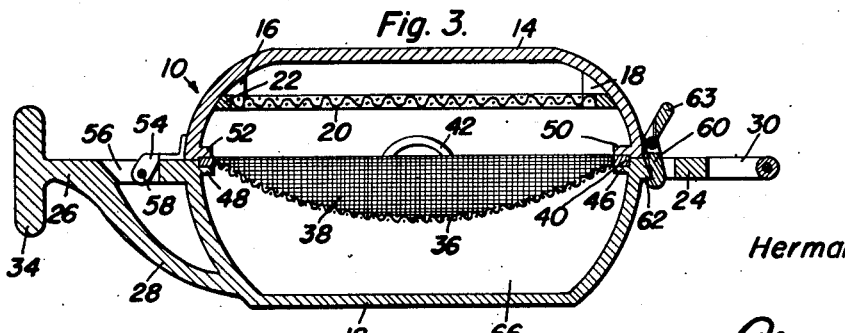
Figure 3 is a sectional view of the device of Figure 1 showing the elements assembled.

There is a casing or housing 10 consisting of a bottom section 12 and a top section or lid 14. The lid is provided with integral blocks 16 and 18, each block being provided with an internally threaded hole.

An upper perforated baffle, as the screen 20, has a bead 22 around the edge thereof and is arranged within the upper section 14, the bead 22 resting upon the blocks 16 and 18. The screen is held in place within the top section 14 intermediate the upper and lower ends thereof by means of the screws 23 which are passed through openings in the screen 20 and into the threaded holes of the blocks 16 and 18.

The lower section 12 is provided with a handle 24 at one end thereof and has a plate 26 extending from the other end thereof, strengthened by the rib 28 which is connected to the plate 26 and to the lower part of the bottom section 12. There is a recess 30 provided in the handle 24 in order to accommodate the hand of an individual and there is a circular hand holding knob 34 at the outer end of the plate 26. If the user of the device does not wish to lift the device, it may be slid off the edge of the table or the like until the knob 34 rests upon the edge of the table. Then the device may be operated by rotating it about an axis through the handle 24 and knob 34.

A second screen 36 is dished downwardly to constitute a food article supporting chamber 38 and a strengthening member 40 is provided along the periphery of the screen 36. Handles 42 are attached to the strengthening member 40 to facilitate lifting the screen 36 from the lower section 12.

The strengthening member 40 is located on the flanges 46 and 48, each of which projects inwardly from the top part of the inside surface of the lower section 12. In order to clamp the screen 36 firmly in place within the casing 10, inwardly extending flanges 50 and 52 are adapted to seat upon the top surface of the strengthening member 40. The flanges 50 and 52 are fixed to the top section 14 of the casing near the lower open end thereof.

A hinge leaf 54 is secured to the outer surface of one end of the top section 14 and has a part thereof passed into the recess 56 formed in the plate 26. A hinge pin 58 is used to pivotally connect the hinge leaf to the plate 26 for pivotal movement so that the top section 14 may be swung to an open or closed position with respect to the lower section 12.

A pivoted latch arm or element 60 is attached to the upper section 14 and is arranged to engage the latch plate or keeper 62 which is fixed to the handle 24 at the inner end thereof. The arm 60 is normally urged in the latching position by means of the spring 63 which reacts on the arm 60 and the upper section 14.

In operation the top section 14 is released from the latch element 60 and swung to the open position. The tray formed by the foraminous element, for example screen 36, with its strengthening member 40, is lifted and the chamber 66 beneath the tray is supplied with a quantity of bread crumbs, flour or other like substance. Then the tray is replaced and the articles of foodstuff disposed thereon. The top section 14 is swung to the closed position and the entire casing 10 shaken, as by reciprocating or rotating it. Some of the flour or other substance for a like purpose passes through the screen 36 and into the chamber 38 to cause the food articles to be coated. The food articles are limited in their movement by the upper screen 20 and yet, by virtue of the fact that the upper limiting means 20 is actually a screen, some of the flour or like substance is capable of passing therethrough so that the articles of foodstuff are coated from not only the bottom, but also the top of the device. Thereafter, the top section 14 is opened and the articles of foodstuff removed or alternatively, the entire tray is lifted by the handles 42.

Having described the invention, what is claimed as new is:

1. A food preparation utensil comprising a casing, said casing including a lower section and an upper section, said upper section being movably connected to said lower section, a tray having a perforate element adapted to support articles of food, said tray and said element being carried by said lower section and being spaced from the bottom of said lower section so that the space between said element and said bottom constitutes a chamber to contain material to be applied to said articles of food, a perforate baffle carried by said upper section and located in spaced relationship to said element when said casing is closed to thereby constitute a means of limiting travel of the articles of food, hand holding members extending from opposite sides of said casing, one of said hand holding members having an aperture, and a latch pivotally connected to said upper section and releasably connected to said lower section, said latch being disposed in said aperture when said casing is closed, whereby said latch holds the upper section fixed with respect to the lower section.

2. The combination of claim 1 and one of said hand-holding members being round and in addition to serving as a hand-holding member, constituting a support for the casing upon which said casing may be rotated in order to apply the material in said chamber to the articles of food.

HERMAN F. RUSSELL.

REFERENCES CITED

The following references are of record in the file of this patent:

UNITED STATES PATENTS

| Number | Name | Date |
|---|---|---|
| 1,569,264 | Clark | Jan. 12, 1926 |
| 2,170,904 | Kircher | Aug. 29, 1939 |

FOREIGN PATENTS

| Number | Country | Date |
|---|---|---|
| 829,700 | France | July 4, 1938 |